US011691795B2

(12) United States Patent
Zhao et al.

(10) Patent No.: US 11,691,795 B2
(45) Date of Patent: Jul. 4, 2023

(54) TRANSPORTATION TOOLING STRUCTURE, SPLIT ELECTRIC MOTOR MODULE WITH TRANSPORTATION TOOLING STRUCTURE, AND TRANSPORTATION METHOD

(71) Applicant: XINJIANG GOLDWIND SCIENCE & TECHNOLOGY CO., LTD., Urumqi (CN)

(72) Inventors: Jiangwei Zhao, Beijing (CN); Jiuyang Luo, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 17/757,560

(22) PCT Filed: Jul. 8, 2020

(86) PCT No.: PCT/CN2020/100931
§ 371 (c)(1),
(2) Date: Jun. 16, 2022

(87) PCT Pub. No.: WO2021/128806
PCT Pub. Date: Jul. 1, 2021

(65) Prior Publication Data

US 2023/0044643 A1 Feb. 9, 2023

(30) Foreign Application Priority Data

Dec. 23, 2019 (CN) ......................... 201911342162.2

(51) Int. Cl.
*B65D 61/00* (2006.01)
*B65D 19/00* (2006.01)
(Continued)

(52) U.S. Cl.
CPC ............ *B65D 61/00* (2013.01); *B65D 19/00* (2013.01); *B65D 25/10* (2013.01); *B65D 25/24* (2013.01);
(Continued)

(58) Field of Classification Search
CPC ........ B65D 19/00; B65D 25/10; B65D 25/24; B65D 61/00; B65D 85/68;
(Continued)

(56) References Cited

U.S. PATENT DOCUMENTS 3,987,990 A 10/1976 Koch et al.
9,963,817 B2 * 5/2018 McLean ................ F16F 1/025
(Continued)

FOREIGN PATENT DOCUMENTS

CN 202006746 U 10/2011
CN 102468694 A 5/2012
(Continued)

OTHER PUBLICATIONS

Chinese Office Action in related Chinese Application No. 201911342162.2, dated Dec. 13, 2021 (28 pages).
(Continued)

*Primary Examiner* — Bryon P Gehman
(74) *Attorney, Agent, or Firm* — Bayes PLLC

(57) ABSTRACT

A transportation tooling structure, a split electric motor module with the transportation tooling structure, and a transportation method are provided. The transportation tooling structure comprises: a split base plate, a stator support and a rotor support, wherein the lower end of the stator support is fixedly supported on the upper surface of the split base plate, and the upper end of the stator support is fixedly supported on the side of a split stator close to the split base plate; and the upper end of the rotor support is fixedly supported on the side of an end of a split rotor away from the
(Continued)

split stator, and the lower end of the rotor support is fixedly supported on the side of the split stator away from the split base plate.

20 Claims, 8 Drawing Sheets

(51) Int. Cl.
*B65D 25/10* (2006.01)
*B65D 25/24* (2006.01)
*B65D 85/68* (2006.01)
*H02K 1/00* (2006.01)
*H02K 15/02* (2006.01)

(52) U.S. Cl.
CPC ...... *B65D 85/68* (2013.01); *B65D 2585/6875* (2013.01); *H02K 1/00* (2013.01); *H02K 15/02* (2013.01)

(58) Field of Classification Search
CPC .... B65D 2585/6825; B65D 2585/6875; H02K 1/00; H02K 15/02
USPC .......................................................... 206/319
See application file for complete search history.

(56) References Cited

U.S. PATENT DOCUMENTS 10,247,287 B2 * 4/2019 Hoebel .................. H02K 7/116
2009/0134627 A1 5/2009 Stiesdal
2013/0276575 A1 * 10/2013 Hoebel .................. F16H 35/00 74/640

FOREIGN PATENT DOCUMENTS

| | | | |
|---|---|---|---|
| CN | 103183184 | A | 7/2013 |
| CN | 203383993 | U | 1/2014 |
| CN | 204324052 | U | 5/2015 |
| CN | 206511322 | U | 9/2017 |
| CN | 107733114 | A | 2/2018 |
| CN | 207108418 | U | 3/2018 |
| CN | 107947501 | A | 4/2018 |
| CN | 207677591 | U | 7/2018 |
| CN | 108471183 | A | 8/2018 |
| CN | 108711966 | A | 10/2018 |
| CN | 109026552 | A | 12/2018 |
| CN | 109625558 | A | 4/2019 |
| CN | 109639016 | A | 4/2019 |
| CN | 109950991 | A | 6/2019 |
| EP | 1621470 | A1 | 2/2006 |

OTHER PUBLICATIONS

Wu Zhenyu et al., The Lightweight Design of Stator Support for Direct-Drive Permanent Magnet Wind Generators, Machine Design and Research, vol. 32, No. 6 (Dec. 2016) (4 pages).
International Search Report in corresponding International Application No. PCT/CN2020/100931 dated Sep. 28, 2020 (11 pages).

* cited by examiner

TRANSPORTATION TOOLING STRUCTURE, SPLIT ELECTRIC MOTOR MODULE WITH TRANSPORTATION TOOLING STRUCTURE, AND TRANSPORTATION METHOD

CROSS-REFERENCE TO RELATED APPLICATIONS

This application is a national stage of International Application No. PCT/CN2020/100931, filed on Jul. 8, 2020, which claims priority to Chinese Patent Application No. 201911342162.2, filed on Dec. 23, 2019. The entire contents of each of the above-identified applications are expressly incorporated herein by reference.

TECHNICAL FIELD

The present application relates to the technical field of motors, and in particular to a transportation tooling structure, a split electric motor module with the transportation tooling structure and a transportation method.

BACKGROUND

A generator with a relatively large size is generally arranged in a wind turbine to convert mechanical energy into electrical energy. Especially for a direct-drive wind turbine, a diameter of the generator can reach more than ten meters. With the development of the large megawatt wind turbine, the size of the generator also needs to be increased accordingly.

That the diameter of the generator of the large megawatt wind turbine is too large may cause trouble in transportation or assembly. At present, it is considered to design the generator as multiple independent generator units, transport the independent generator units separately, and then splice the multiple generator units into a complete generator through hoisting after a construction site is arrived. In this way, the simultaneous cooperation of multiple cranes and personnel is required, which is time-consuming and laborious.

At present, a modular generator is designed to solve the transportation problem of the generator with the large diameter. Since the generator needs to be mounted on site and the assembly of a stator and a rotor on site is difficult, the site is much easier if the stator and the rotor of the generator can be transported at their original assembly positions.

A generator in the conventional technology includes a stator with multiple stator segments and a rotor with multiple rotor segments, and at least one of the stator segments and at least one of the rotor segments can temporarily abut against for overall transportation and mounting. However, the structure of the motor, especially the structure for temporary abutment, is complex and difficult to manufacture.

SUMMARY

In one aspect, a transportation tooling structure of a split motor module is provided according to an embodiment of the present application, the split motor module includes a split rotor and a split stator which are arranged according to a preset assembly requirement, the transportation tooling structure include a split base plate, and the split base plate is correspondingly provided with at least one stator support and at least one rotor support; a lower end of the stator support is fixedly supported on an upper surface of the split base plate, and an upper end of the stator support is fixedly supported on a side, close to the split base plate, of the split stator; and an upper end of the rotor support is fixedly supported on a side of an end, close to the split stator, of the split rotor, and a lower end of the rotor support is fixedly supported on a side, away from the split base plate, of the split stator.

In a second aspect, a split motor module with a transportation tooling structure is provided according to an embodiment of the present application, which includes a split rotor and a split stator which are arranged according to a preset assembly requirement, and the transportation tooling structure according to the first aspect; the upper end of the stator support is fixedly supported on the side, close to the split base plate, of the split stator; and the upper end of the rotor support is fixedly supported on the side of the end, close to the split stator, of the split rotor, and the lower end of the rotor support is fixedly supported on the side, away from the split base plate, of the split stator.

In a third aspect, a transportation method for a modular motor is provided according to an embodiment of the present application, which includes: arranging an assembled modular motor upside down on an upper surface of a base plate, so that multiple split motor modules are in one-to-one correspondence with multiple split base plates of the base plate; inserting two ends of a stator support respectively in a base plate side stator support base and a corresponding stator-side stator support base respectively, inserting two ends of a rotor support in a stator-side rotor support base and a corresponding rotor-side rotor support base; splitting a parting surface at a connection of each split rotor, a parting surface at a connection of each split stator, and a connecting member between the split base plates; and transporting the split motor module with a transportation tooling structure separately after a shafting is disassembled.

The technical solutions provided according to the embodiments of the present application have at least the following beneficial effects: in the transportation tooling structure of the split motor module provided according to the embodiments of the present application, the stator support with a fixed support function between the split stator and the split base plate, and the rotor support with a fixed support function between the split stator and the end of the split rotor are provided, so that the whole split motor module can be transported with the split base plate on the premise of maintaining the preset assembly position of the split stator and the split rotor, which solves the problem of difficult overall transportation of the large-diameter modular motor, and the transportation tooling structure is simple and is easy to manufacture and mount.

The additional aspects and advantages of the present application will be further described in the following description, which will become apparent from the following description or be understood through the embodiments of the present application.

BRIEF DESCRIPTION OF DRAWINGS

The above and/or additional aspects and advantages of the present application will become apparent and easy to understand with reference to the following description of embodiments in conjunction with the drawings.

Figure 1:
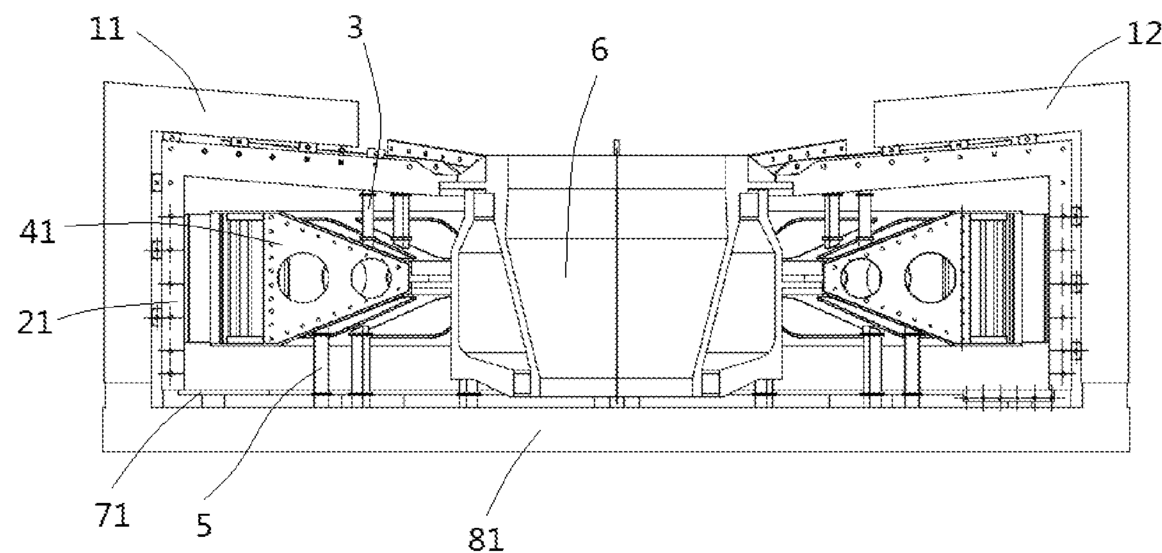
FIG. 1 is a schematic structural view of a split motor module (including a shafting) with a transportation tooling structure provided according to an embodiment of the present application.

The reference numerals are as follows:

1-rigid reinforcement tooling;
11-first rigid reinforcement tooling structure;
111-first reinforcement fixing seat;
12-second rigid reinforcement tooling structure;
121-second reinforcement fixing seat;
13-third rigid reinforcement tooling structure;
131-mounting hole;
2-rotor;
21-split rotor;
211-first flange fixing seat;
212-fixing seat hole;
213-rotor-side rotor support base;
214-first side flange;
215-side flange hole;
216-reinforcement rib;
217-reinforcement rib hole;
218-second side flange;
219-second flange fixing seat;
3-rotor support;
4-stator;
41-split rotor;

-continued 411-first side fixing plate;
412-first stator fixing hole;
413-stator-side stator support base;
414-second side fixing plate;
415-second stator fixing hole;
416-stator-side rotor support base;
417-iron core;
418-winding;
5-stator support;
6-shafting;
7-rotor end plate;
71-split rotor end plate;
710-parting surface;
711-fixing side plate;
712-end plate fixing hole;
8-base plate;
81-split base plate;
811-base plate side stator support base.

DETAILED DESCRIPTION

The embodiments of the present application are described in detail hereinafter, and are illustrated in drawings, in which the same or similar reference signs represent the same or similar elements or elements with the same or similar functions throughout the description. In addition, if a detailed description of the known technology is unnecessary for the illustrated features of the present application, it will be omitted. The embodiments described in the following with reference to the drawings are only exemplary embodiments which are used to explain the present application, and should not be construed to limit the present application.

It should be understood by those skilled in the art that all terms (including technical and scientific terms) used herein have the same meaning as commonly understood by one of ordinary skilled in the art to which the present application belongs, unless otherwise defined. It should also be understood that terms such as those defined in a general dictionary have the same meaning as that in the context of the prior art unless specifically defined, and should not be interpreted in an idealized or overly formal sense.

Those skilled in the art should understand that, unless explicitly stated, the singular forms used herein such as “a”, “an”, “one”, and “this one” are intended to include the plural forms. It should be further understood that, the terms “include/comprise”, when used in the description, indicate the existence of a feature, an integer, a step, an operations, an element and/or a component, but does not exclude the existence or addition of one or more of other features, integers, steps, elements, components and/or combinations thereof. It should be understood that the term “and/or” used herein includes all or any unit or all combinations of one or more associated listed items.

A motor includes a stator and a rotor, and the rotor of the motor with different diameters can be selected according to the different power levels of the motor. In order to facilitate the transportation of a generator with a large diameter, the generator is generally arranged as multiple independent split rotors and multiple independent split stators. A single split rotor corresponds to a single split stator to form a single split motor module according to a preset assembly requirement. Each split motor module is transported separately. After the transportation process is completed, the multiple split motor modules are assembled to form the complete rotor and the complete stator, and then the assembly of the motor is completed based on the complete rotor and the complete stator.

Figure 2:
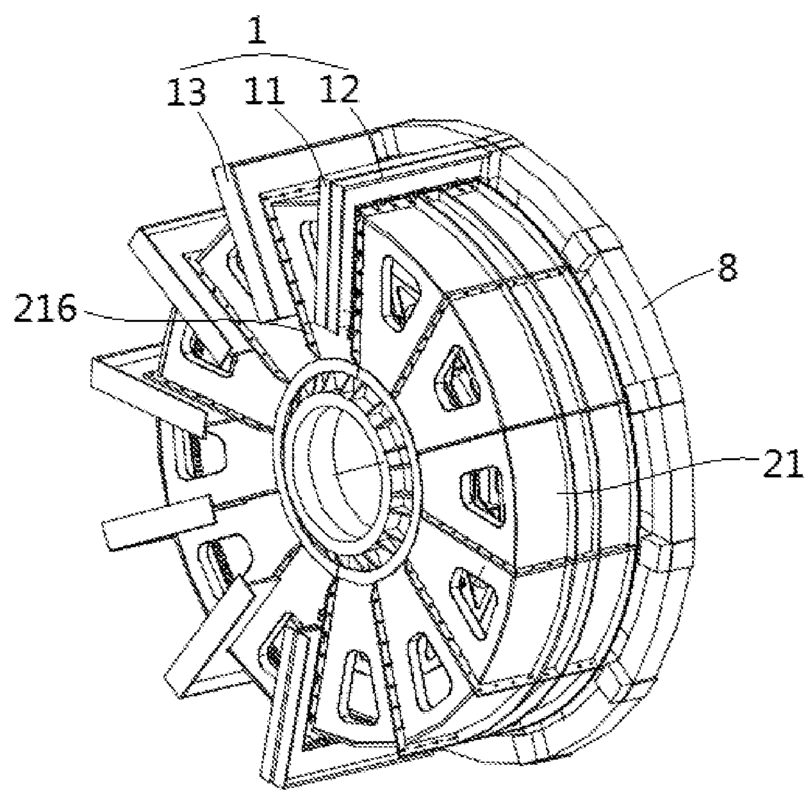
FIG. 2 is a schematic structural view of a modular motor with the transportation tooling structure provided according to the embodiment of the present application.

FIG. 1 is a schematic structural view of a split motor module with a transportation tooling structure provided according to an embodiment of the present application; and FIG. 2 is a schematic structural view of a modular motor after the transportation tooling structure is mounted according to an embodiment of the present application. In order to facilitate understanding, the following is a clear and detailed description of the transportation tooling structure of the split motor module according to the embodiment of the present application in combination with FIG. 1 and FIG. 2. The split motor module includes a split rotor 21 and a split stator 41 which are arranged according to a preset assembly requirement. The transportation tooling structure includes a split base plate 81, and the split base plate 81 is correspondingly provided with at least one stator support 5 and at least one rotor support 3.

A lower end of the stator support 5 is fixedly supported on an upper surface of the split base plate 81, and an upper end of the stator support 5 is fixedly supported on a side, close to the split base plate 81, of the split stator 41; an upper end of the rotor support 3 is fixedly supported on a side of an end, close to the split stator 41, of the split rotor 21, and a lower end of the rotor support 3 is fixedly supported on a side, away from the split base plate 81, of the split stator 41.

In the transportation tooling structure of the split motor module provided according to the embodiments of the present application, the stator support 5 with a fixed support function between the split stator 41 and the split base plate 81 and the rotor support 4 with a fixed support function between the split stator 41 and the end of the split rotor 21 are provided, so that the whole split motor module can be transported with the split base plate 81 on the premise of maintaining the preset assembly position of the split stator 41 and the split rotor 21, which solves the problem of difficult overall transportation of the large-diameter modular motor, and the transportation tooling structure is simple and is easy to manufacture and mount.

Figure 3:
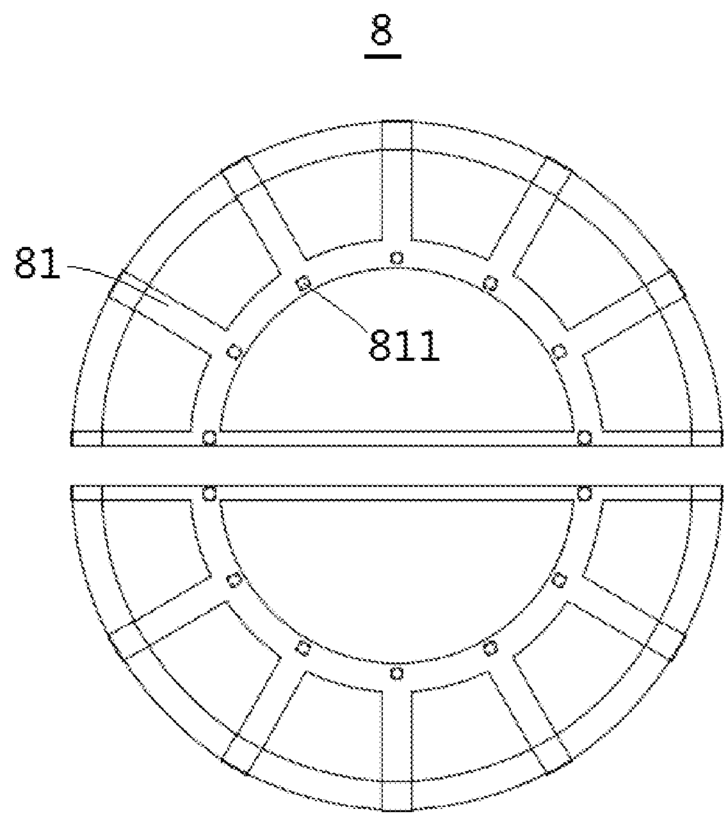
FIG. 3 is a schematic top view of a split structure of a base plate with the transportation tooling structure provided according to the embodiment of the present application.
Figure 4:
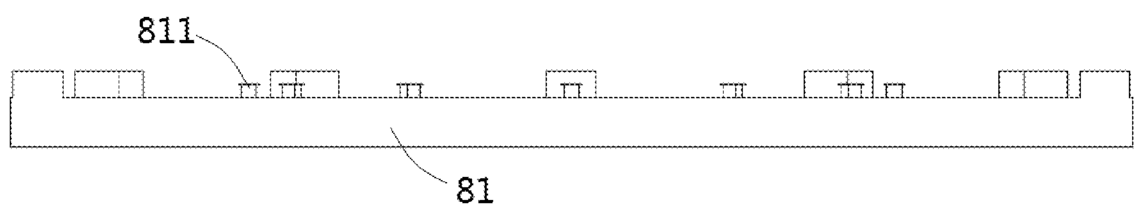
FIG. 4 is a front view of a split base plate with the transportation tooling structure provided according to the embodiment of the present application.
Figure 8:
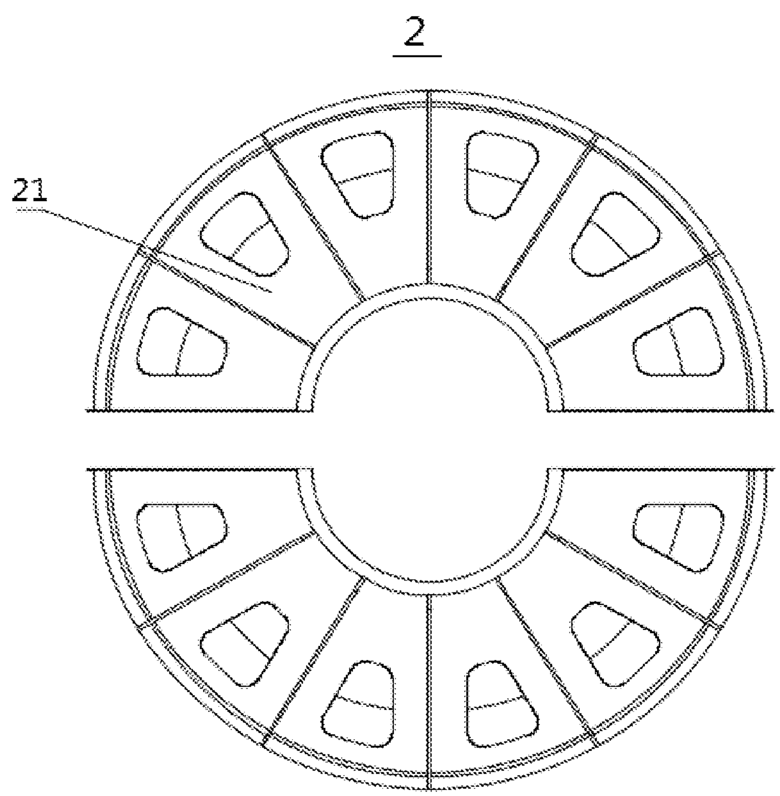
FIG. 8 is a schematic top view of a split structure of a rotor of the modular motor provided according to the embodiment of the present application.
Figure 11:
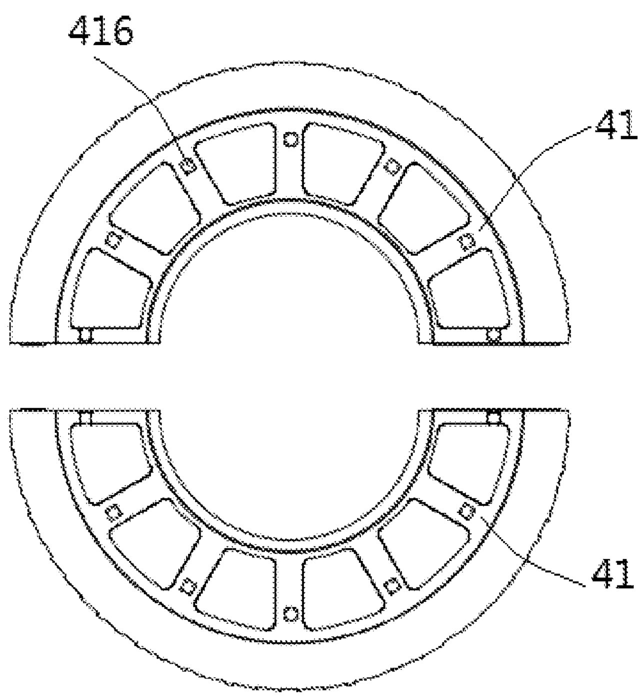
FIG. 11 is a schematic top view of a split structure of a stator of the modular motor provided according to the embodiment of the present application.

Specifically, as shown in FIG. 8 and FIG. 11, a single split motor module can be regarded as a part of the whole modular motor after splitting, which includes a split rotor 21 and a split stator 41. The split rotor 21 and the split stator 41 are arranged correspondingly and arranged according to the preset assembly requirement (for example, maintaining an original air gap), so as to facilitate rapid mounting after transportation. In order to keep the preset assembly position of the split rotor 21 and the split stator 41 unchanged during transportation, as shown in FIG. 3 and FIG. 4, in this embodiment, the split base plate 81 is used as a base of the whole split motor, and a single split base plate 81 can be regarded as a part of a base plate 8 after being split along a radial direction. A diameter of the base plate 8 should be slightly larger than a diameter of the whole modular motor, a size of the split base plate 8 is adaptively adjusted according to a size of the split motor module, and the split base plates 8 can be detachably connected to form the base plate 8.

The number of the stator supports 5 and the rotor supports 3 on the split base plate 81 can be provided according to the actual demand, as long as it can meet the fixed support of the split stator 41 and the split rotor 21. The specific number here may not be limited. The stator support 5 and the rotor support 3 can be rigid pipes or rods, and cross sections of the stator support 5 and the rotor support 3 can be rectangular, circular or annular. In order to enhance the effect of fixed support, the cross sections of the stator support 5 and the rotor support 3 can be appropriately increased.

In a case that the split base plate 81 is placed horizontally, the split motor module is located directly above the split base plate 81, the lower end of the stator support 5 is fixedly supported on the upper surface of the split base plate 81, and the upper end of the stator support 5 is fixedly supported on the side, close to the split base plate 81, of the split stator 41. The specific fixed support method of the stator support 5 may be a fixed connection through the fastening of a connecting member, or an inserting connection of the stator support 5 passing through the upper surface of the split base plate 81 and the mounting seat reserved on the side, close to the split base plate 81, of the split stator 41. Alternatively, in order to strengthen the fixing effect, the split stator 41 can also be fixedly supported through the combination of the inserting connection of the mounting seat and the fastening of the connecting member.

Similarly, the upper end of the rotor support 3 is fixedly supported at the end of the split rotor 21, and the upper end of the rotor support 3 is specifically fixedly supported at the side, close to the split stator 41, of the end of the split rotor 21 according to the preset assembly requirement of the split rotor 21 and the split stator 41; and the lower end of the rotor support 3 is fixedly supported on the side, away from the split base plate 81, of the split stator 41. The specific fixed support method of the rotor support 3 may be a fixed connection through the fastening of the connecting member, or an inserting connection of the rotor support 3 passing through the end of the split rotor 21 and the mounting seat reserved on the side, away from the split base plate 81, of the split stator 41. Alternatively, in order to strengthen the fixing effect, the split stator 41 can also be fixedly supported through the combination of the inserting connection of the mounting seat and the fastening of the connecting member.

It should be noted that the rotor of the motor can be regarded as a cylindrical structure with an open end, the end of the split rotor 21 is an end of the rotor. Since the open end of the rotor faces the base plate 8, the end of the split rotor 21 is regarded as an end, away from the split base plate 81, of the split rotor 21.

According to an embodiment of the present application, referring to FIG. 1, optionally, an extending direction of the stator support 5 and an extending direction of the rotor support 3 are perpendicular to the split base plate 81.

In this embodiment, the extending direction of the stator support 5 and the extending direction of the rotor support 3 are perpendicular to the split base plate 81, which is equivalent to the situation that the stator support 5 and the rotor support 3 are arranged in a vertical direction for the split base plate 81 which is placed horizontally, so as to improve the support strength of the split stator 41 and the split rotor 21, and be beneficial to maintaining the support stability of the whole split motor module.

According to the embodiment of the present application, further referring to FIG. 1 and FIG. 3, optionally, multiple stator supports 5 and multiple rotor supports 3 are provided. The multiple stator supports 5 are arranged in an arc array on the upper surface of the split base plate 81, and projection of the multiple rotor supports 3 on the upper surface of the split base plate 81 are arranged in an arc array.

In this embodiment, the multiple stator supports 5 and the multiple rotor supports 3 are provided, the multiple stator supports 5 are arranged in the arc array on the upper surface of the split base plate 81, and the projection of the multiple rotor supports 3 on the upper surface of the split base plate 81 are arranged in the arc array, which can further improve the support strength and stability of the split stators 41 and the split rotors 21. The number of the plurality of stator supports 5 and the plurality of rotor supports 3 may be the same or different, and may be selectively provided according to the specific size and structure of the split rotor 21 and the split stator 41.

Specifically, since the split rotor 21 and the split stator 41 have a substantial semicircle or a fan-shaped structure, the multiple stator supports 5 are arranged in the arc array on the upper surface of the split base plate 81, and the arc formed by projections of the multiple stator supports 5 on the split base plate 81 has a same center as the base plate 8 corresponding to the split base plate 81, so as to allow the suffering force of each stator support 5 and each rotor support 3 to be uniform, and improve the support strength of the split stator 41 and the split rotor 21. In order to allow the suffering force of the rotor support 3 to be uniform, the projections of the multiple rotor supports 3 on the upper surface of the split base plate 81 are also arranged in the arc array. It should be noted that the arc formed by the projection of the multiple rotor supports 3 on the upper surface of the split base plate 81 and the arc formed by the projection of the multiple stator supports 5 on the split base plate 81 can have the same radius or different radii, which can be set according to actual needs.

According to an embodiment of the present application, as shown in FIG. 3 and FIG. 4, a base plate side stator support base 811 with an opening facing the split stator 41 is provided on the upper surface of the split base plate 81, each base plate side stator support base 811 is in one-to-one correspondence with each stator support 5, and a lower end of each stator support 5 is inserted in the corresponding base plate side stator support base 811.

In this embodiment, it is convenient for the lower end of the stator support 5 and the split base plate 81 to be fixedly supported by inserting through arranging the base plate side stator support base 811 on the upper surface of the split base plate 81, which can improve the mounting efficiency of the transportation tooling structure.

Specifically, the base plate side stator support base 811 is a mounting seat which extends upward from the upper surface of the split base plate 81. The mounting seat has a cylindrical structure with an open upper end, and an interior of the cylindrical structure is matched with the lower end of the split stator 41, and a matching gap can be properly reserved. Certainly, corresponding multiple base plate side stator support bases 811 are provided in the case of the multiple supporting stators 5, and the multiple base plate side stator support bases 811 can also be arranged according to the arc array, so that the multiple stator supports 5 are arranged in the arc array on the upper surface of the split base plate 81, which improves the support strength and stability of the split motor module.

Alternatively, in order to improve the connection strength between the stator support 5 and the split base plate 81, a mounting hole is defined in the base plate side stator support base 811 in a direction perpendicular to the stator support 41, and a connecting hole corresponding to the mounting hole in position is defined in the lower end of the stator support 5, so that the lower end, inserted in the base plate side stator support base 811, of the stator support 5 can be fixed (for example, through a bolt fastener).

Figure 10:
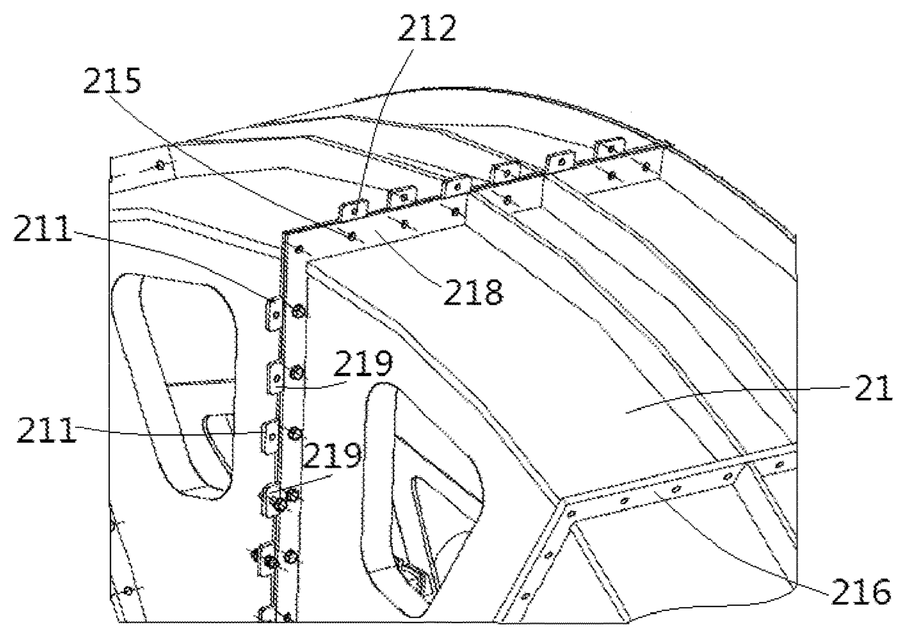
FIG. 10 is a schematic structural view of a connection between adjacent split rotors of the modular motor provided according to the embodiment of the present application.

According to an embodiment of the application, as shown in FIG. 2 and FIG. 10, in order to enhance the rigidity of a parting surface of the split rotor 21, the transportation tooling structure in this embodiment includes a rigid reinforcement tooling 1 for enhancing the rigidity of the split rotor 21 in addition to the split base plate 81, the stator support 5 and the rotor support 3 in the above embodiments.

The rigid reinforcement tooling 1 includes a first rigid reinforcement tooling structure 11 and a second rigid reinforcement tooling structure 12, the first rigid reinforcement tooling structure 11 is detachably connected with a side flange at one parting surface of the split rotor 21, and the second rigid reinforcement tooling structure 12 is detachably connected with a side flange at another parting surface of the split rotor 21.

The first rigid reinforcement tooling structure 11 and the second rigid reinforcement tooling structure 12 are formed by butting ends of two first plate-shaped structures with an extending direction in a right angle or a substantially right angle; or the first rigid reinforcement tooling structure 11 and the second rigid reinforcement tooling structure 12 are both of a first plate-shaped structure with an extending direction in a right angle or a substantially right angle; and cross sections of the first plate-shaped structures are L-shaped.

In this embodiment, the parting surface of the split rotor 21 is a connecting surface of the split rotor 21 when the split rotor 21 is assembled with the adjacent split rotor 21. The rigidity at the parting surfaces of the split rotor 21 is enhanced by mounting the first rigid reinforcement tooling structure 11 and the second rigid reinforcement tooling structure 12 which are matched the parting surfaces at the two parting surfaces of the split rotor 21 respectively, which can prevent the rotor from deforming due to weak rigidity or being damaged by absorption of the split stator 41 after the rotor is split into the split rotors 21.

Figure 5:
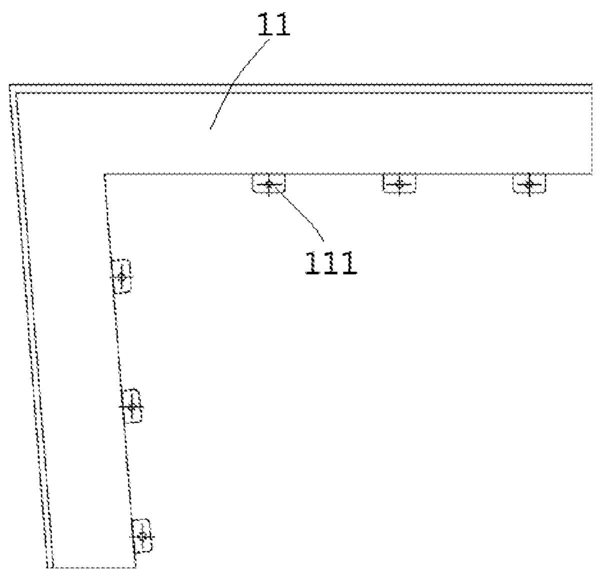
FIG. 5 is a schematic structural view of a first rigid reinforcement tooling structure of the transportation tooling structure provided according to the embodiment of the present application.
Figure 6:
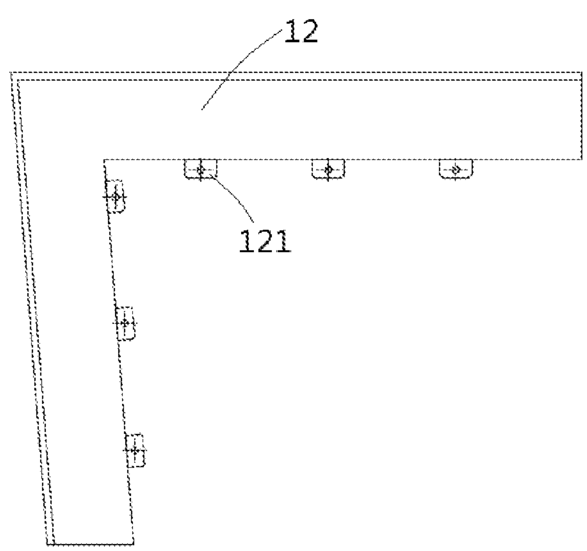
FIG. 6 is a schematic structural view of a second rigid reinforcement tooling structure of the transportation tooling structure provided according to the embodiment of the present application.
Figure 9:
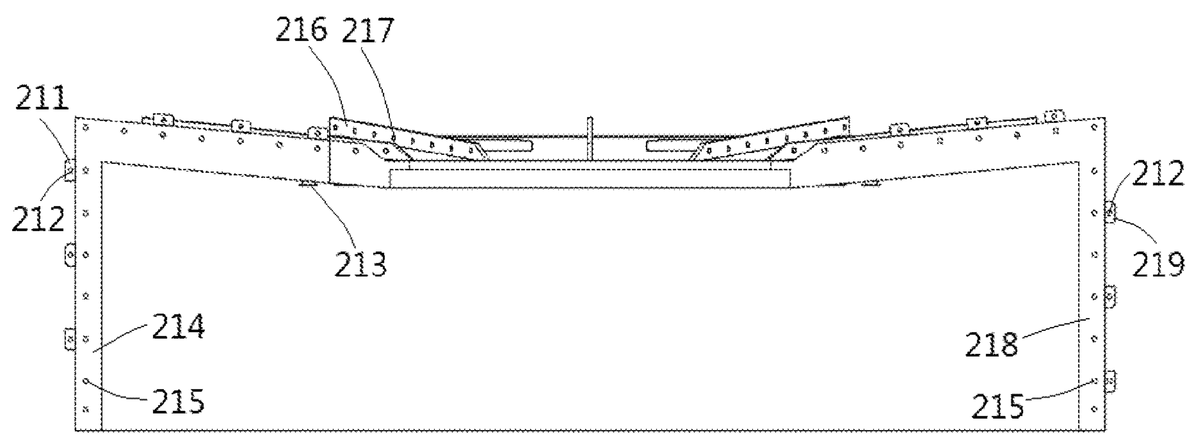
FIG. 9 is a schematic axial cross-sectional view of a split rotor of the modular motor provided according to the embodiment of the present application.

Specifically, as shown in FIG. 5 and FIG. 6, an overall shape of the first rigid reinforcement tooling structure 11 and the second rigid reinforcement tooling structure 12 is similar to the L-shape, which is related to the shape of an axial cross section of the split rotor 21 in FIG. 9. This structural design can be matched with the shape of each parting surface of the split rotor 21. The first rigid reinforcement tooling structure 11 and the second rigid reinforcement tooling structure 12 can form an overall L-shaped tooling structure by ends of two separate first plate-shaped structures with an extending direction at a right angle or a substantially right angle by means of welding, inserting or bolt connection. The first rigid reinforcement tooling structure 11 and the second rigid reinforcement tooling structure 12 may be of the first plate-shaped structure with the extension direction in the right angle or the substantially right angle (equivalent to an L-shape as a whole), and the first plate-shaped structure can be integrally formed by a corresponding mold.

In this embodiment, the side flanges at the two parting surfaces of the split rotor 21 can be defined as a first side flange 214 and a second side flange 218 respectively. The first rigid reinforcement tooling structure 11 is connected with the first side flange 214, and the second rigid reinforcement tooling structure 12 is connected with the second side flange 218. In order to facilitate mounting and disassembly, both the first rigid reinforcement tooling structure 11 and the second rigid reinforcement tooling structure 12 are detachably mounted, such as clamp or bolt connection.

In order to facilitate the mounting of the parting surface of the adjacent split rotor 21, the first rigid reinforcement tooling structure 11 is mounted on a side, away from the parting surface, of the first side flange, and the second rigid reinforcement tooling structure 12 is mounted on a side, away from the parting surface, of the second side flange 218. Since the cross sections of the first plate-shaped structures for forming the first rigid reinforcement tooling structure 11 and the second rigid reinforcement tooling structure 12 are L-shaped, the first rigid reinforcement tooling structure 11 and the second rigid reinforcement tooling structure 12 on the side flanges at the parting surfaces of the adjacent split rotors 21 can be mounted "back-to-back", which can avoid interference during the mounting of the reinforcement tooling. The ends of the two first plate-shaped structures can be fixedly connected by means of screws, riveting, welding or integrated forming.

Figure 7:
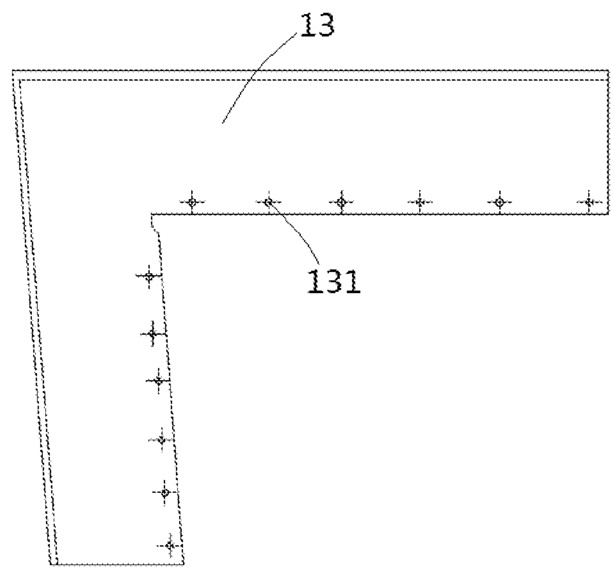
FIG. 7 is a schematic structural view of a third rigid reinforcement tooling structure of the transportation tooling structure provided according to the embodiment of the present application.

Based on the above embodiments, as shown in FIG. 2, FIG. 7 and FIG. 9, in addition to the first rigid reinforcement tooling structure 11 and the second rigid reinforcement tooling structure 12 at the parting surfaces, the rigid reinforcement tooling 1 further includes a third rigid reinforcement tooling structure 13 for being detachably connected with a reinforcement rib 216 on an outer side surface of the split rotor 21.

The third rigid reinforcement tooling structure 13 is formed by butting ends of two second plate-like structures with an extending direction in a right angle or a substantially right angle; or, the third rigid reinforcement tooling structure 13 is of the second plate-shaped structure with the extending direction at the right angle or the substantially right angle; and a cross section of the second plate-shaped structure is T-shaped or L-shaped.

In this embodiment, the rigidity between the two parting surfaces of the split rotor 21 can be enhanced by mounting the third rigid reinforcement tooling 13 on the outer side surface of the split rotor 21. In order to facilitate the mounting of the third rigid reinforcement tooling 13, the reinforcement rib 216 can be pre-provided on the outer side surface of the split rotor 21, and the reinforcement rib 216 can be welded, bolted or integrally formed with the split rotor 21. The reinforcement rib 216 is located between the first side flange 214 and the second side flange 218 of the same split rotor 21. The specific number and spacing of the reinforcement rib 216 can be appropriately adjusted according to the size of the split rotor 21.

The third rigid reinforcement tooling structure 13 may be an overall L-shaped tooling structure formed by the ends of the two separate second plate-shaped structures with an extending direction in a right angle or a substantially right angle by means of welding, inserting or bolt connection. The third rigid reinforcement tooling structure 13 may be of the second plate-shaped structure with the extension direction at the right angle or the substantially right angle (equivalent to an L-shape as a whole), and the first plate-shaped structure can be integrally formed by a corresponding mold.

Specifically, in order to improve the mounting efficiency of the third rigid reinforcement tooling structure 13, the third rigid reinforcement tooling structure 13 is detachably connected with the reinforcement rib 216, such as by clamping or bolt connection. Multiple reinforcement rib holes 217 can be defined in the reinforcement rib 216, and mounting holes 131 corresponding to the reinforcement rib hole 217 in position can be defined in the third rigid reinforcement tooling structure 13. The reinforcement rib holes 217 and the mounting holes 131 are fastened by bolts, so as to further improve the rigidity of the split rotor 21.

In addition, since the shape of the reinforcement rib 216 is matched with the axial cross section of the split rotor 21, the third rigid reinforcement tooling structure 13 in this embodiment is formed by butting the ends of two second plate-like structures with the extending direction in the right angle or the substantially right angle, so as to form a structure with an overall shape similar to the L-shape. The ends of the two second plate-like structures can also be fixedly connected by means of screws, riveting, welding or integrated forming.

Alternatively, the cross section of the second plate-shaped structure can be T-shaped or L-shaped, which has a better rigidity than the cross section of an in-line shape. In the case that the cross section of the second plate-shaped structure is T-shaped, the second plate-shaped structure includes a transverse rib and a longitudinal rib which is vertically connected in the middle of the transverse rib. The mounting hole 131 can be arranged in the longitudinal rib, so as to realize the connection with the reinforcing rib hole 217.

According to an embodiment of the application, as shown in FIG. 2, the following embodiments can be adopted to further enhance the rigidity of the split rotor 21 considering the large deformation of the split rotor 21 that: in the first rigid reinforcement tooling structure 11 and the second rigid reinforcement tooling structure 12, the first plate structures located on an outer circumference of the split rotor 21 are fixedly connected with the upper surface of the split base plate 81 respectively; in the third rigid reinforcement tooling structure 13, the second plate-shaped structure located on the outer circumferential surface of the split rotor 21 is fixedly connected with the upper surface of the split base plate 81.

In this embodiment, ends, close to the split base plate 81, of the first rigid reinforcement tooling structure 11, the second rigid reinforcement tooling structure 12 and the third rigid reinforcement tooling structure 13 are fixedly connected with the split base plate 81, so as to further enhance the rigidity of the split rotor, which can also disperse the support forces of the support stator 5 and the support rotor 7, and improve the support stability of the whole transportation tooling structure on the split motor module.

Specifically, since the first rigid reinforcement tooling structure 11, the second rigid reinforcement tooling structure 12 and the third rigid reinforcement tooling structure 13 are all regarded as structures with an overall shape similar to L-shape, the horizontal section in the L-shaped structure is connected with an outer side surface of the end of the split rotor 21, and the vertical section in the L-shaped structure is connected with the outer circumferential surface of the split rotor 21, and lower ends of the vertical sections in the L-shaped structures can all be connected with the upper surface, close to an outer edge, of the split base plate 81, so as to strengthen the support of the whole split rotor 21.

The lower end of the vertical section in each L-shaped structure can be connected with the upper surface of the split base plate 81 by riveting or bolt connection. Alternatively, in order to facilitate the connection, a corresponding connection base can further be arranged on the upper surface, close to the outer edge, the split base plate 81, so as to realize the connection with the first rigid reinforcement tooling structure 11, the second rigid reinforcement tooling structure 12 and the third rigid reinforcement tooling structure 13 by the connection base.

Figure 13:
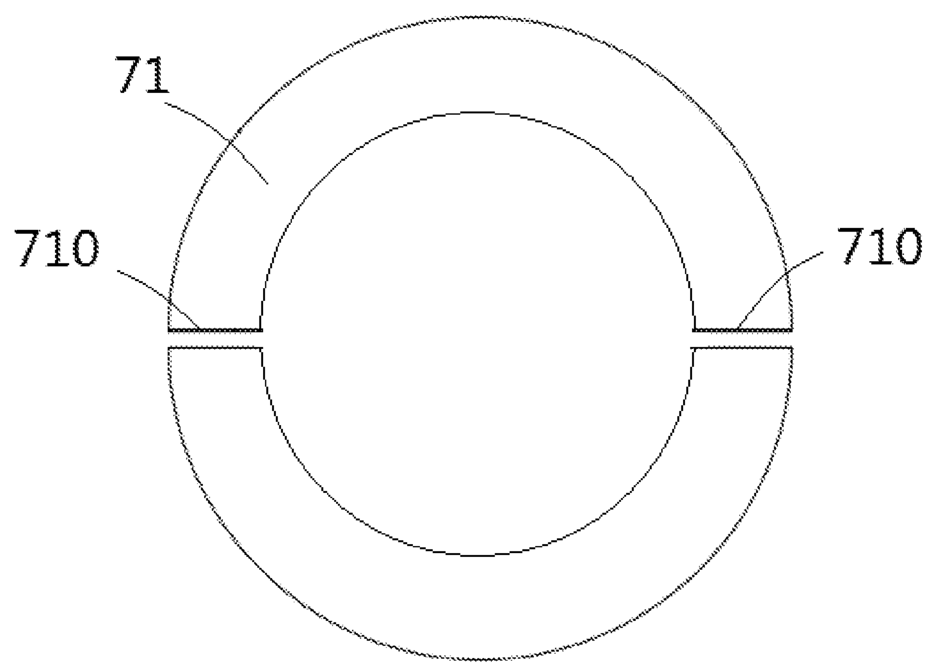
FIG. 13 is a schematic top view of a split structure of a rotor end plate of the transportation tooling structure provided according to the embodiment of the present application.
Figure 14:
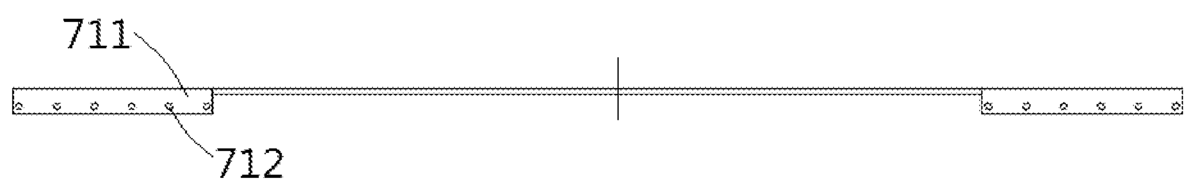
FIG. 14 is a front view of a split rotor end plate of the transportation tooling structure provided according to the embodiment of the present application.

According to an embodiment of the present application, as shown in FIG. 13 and FIG. 14, in order to enhance the rigidity along a circumferential direction of the split rotor, the transportation tooling structure provided according to the embodiment further includes a split rotor end plate 71. The split rotor end plate 71 is arranged in parallel above the split base plate 81, and an outer edge of the split rotor end plate 71 is detachably connected with an inner circumferential surface of an open end of the split rotor 21.

The split rotor end plate 71 has a partial annular structure; or, a hollow portion for the stator support 5 to pass through is reserved on the split rotor end plate 71.

In this embodiment, the split rotor end plate 71 is arranged on the inner circumferential surface of the open end of the split rotor 21, and the split rotor is supported by the split rotor end plate 71, so as to improve the rigidity along the circumferential direction of the split rotor 21, prevent the split rotor 21 from deforming or being damaged caused by the adsorption of the split stator 41, and facilitate the split transportation according to the preset assembly requirement.

Specifically, in this embodiment, the split rotor end plate 71 can be regarded as a part of the rotor end plate 7 after being split along a radial direction. A diameter of the rotor end plate 7 is matched with an inner diameter of the split rotor 21, and the rotor end plate 7 can be formed by detachable connection of the split rotor end plates 71. The whole rotor end plate 7 can be connected with the inner circumference of the rotor 2 as a whole before split transportation, as long as the split rotor end plates 71 can be connected with the split rotors 21 in one-to-one correspondence. The split rotor end plate 71 is detachably connected with the inner circumferential surface of the open end of the corresponding split rotor 21, so that the disassembly can be realized after the modular motor is assembled.

It should be noted that the open end of the split rotor 21 is an open end of the rotor 2. The open end of the rotor 2 is located at an end, away from the rotor 2, of the rotor 2. The open end of the split rotor 21 is close to the split base plate 81 when the split rotor 21 is arranged on the split base plate 81, so that an outer edge of the split rotor end plate 71 is located above the split base plate 81 when the outer edge of the split rotor end plate 71 is connected with the inner circumferential surface of the split rotor 21.

In addition, considering that the stator support 5 is arranged between the split stator 41 and the split base plate 81, the whole rotor end plate 7 can be arranged as an annular structure with a space for mounting the stator support 5 reserved in the middle, that is, the split rotor end plate 71 is of a partial annular structure, so as to avoid interference between the stator support 5 and the split rotor 71. Alternatively, a hollow portion for the stator support 5 to pass through can be reserved on the split rotor end plate 71, and a size and position of the hollow portion can be set according to the position for fixed support on the rotor 2.

Based on the same inventive concept, as shown in FIG. 1 and FIG. 2, a split motor module with a transportation tooling structure is provided according to the embodiment of the present application, which includes: a split rotor 21 and a split stator 41 which are arranged according to a preset assembly requirement, and the transportation tooling structure in the above embodiments; the lower end of the stator support 5 is fixed on the upper surface of the split base plate 81, and the upper end of the stator support 5 is fixed on the side, close to the split base plate 81, of the split stator 41; the upper end of the rotor support 3 is fixedly supported on the side, close to the split stator 41, of the end of the split rotor 21, and the lower end of the rotor support 3 is fixedly supported on the side, away from the split base plate 81, of the split stator 41.

In this embodiment, for how the stator support 5 and the rotor support 3 realize the fixed support for the split stator 41 and the split rotor 21 in the split motor module, reference can be made to the content of the transportation tooling structure in the above embodiments, which will not be described in detail here.

In the split motor module with the transportation tooling structure provided in this embodiment, the stator support 5 with a fixed support function between the split stator 41 and the split base plate 81, and the rotor support 4 with a fixed support function between the split stator 41 and the end of the split rotor 21 are provided, so that the whole split motor module can be transported with the split base plate 81 on the premise of maintaining the preset assembly position of the split stator 41 and the split rotor 21, which solves the problem of difficult overall transportation of the large-diameter modular motor, and the transportation tooling structure is simple and is easy to manufacture and assembly.

According to an embodiment of the present application, two parting surfaces of the split rotor 21 are respectively provided with a first side flange 214 and a second side flange 218, the first rigid reinforcement tooling structure 11 is detachably connected with the first side flange 214, and the second rigid reinforcement tooling structure 12 is detachably connected with the second side flange 218.

In this embodiment, the set position of the first side flange 214 and the second side flange 218 and the connection mode of the first rigid reinforcement tooling 11 and the second rigid reinforcement tooling 12 can make reference to the content of the transportation tooling structure in the above embodiments, which will not be described in detail here.

In the split motor module with the transportation tooling structure in this embodiment, the parting surface of the split rotor 21 is a connecting surface of the split rotor 21 when the split rotor 21 is assembled with the adjacent split rotor 21. The rigidity at the parting surfaces of the split rotor 21 is enhanced by mounting the first rigid reinforcement tooling structure 11 and the second rigid reinforcement tooling structure 12 which are matched the parting surfaces at the two parting surfaces of the split rotor 21 respectively, thereby preventing the rotor from deforming due to weak rigidity or being damaged by absorption of the split stator 41 after the rotor is split into the split rotors 21.

Based on the above embodiments, as shown in FIG. 2 and FIG. 9, multiple first flange fixing seats 211 extend from an edge of the first side flange 214 in a direction away from the split stator 41, and multiple second flange fixing seats 219 extend from an edge of the second side flange 218 in the direction away from the split stator 41; the multiple first flange fixing seats 211 and the multiple second flange fixing seats 219 are asymmetric with respect to a centerline of the split rotor 21; multiple first reinforcement fixing seats 111 are provided in the first rigid reinforcement tooling structure 11, and the multiple first reinforcement fixing seats 111 are detachably connected with the multiple first flange fixing seats 211; and multiple second reinforcement fixing seats 121 are provided in the second rigid reinforcement tooling structure 12, and the multiple second reinforcement fixing seats 121 are detachably connected with the multiple second flange fixing seats 219.

In this embodiment, by arranging the first flange fixing seats 211 and the second flange fixing seats 219 on the first side flange 214 and the second side flange 218 which are asymmetric with respect to the centerline of the split rotor 21, it is possible to prevent the rigid reinforcement tooling on the corresponding side flanges from interfering and affecting the mounting when the adjacent split rotors 21 are connected.

Specifically, a fixing seat hole 212 is respectively defined on the first flange fixing seats 211 and the second flange fixing seats 219, and mounting holes corresponding to the fixing seat hole 212 are respectively defined on the first reinforcement fixing seats 111 correspondingly connected with the first flange fixing seats 211 and the second reinforcement fixing seats 121 correspondingly connected with the second flange fixing seats 219, and the mounting hole is fixedly connected with the fixing seat hole 212 by a bolt after alignment.

It should be noted that a side flange hole 215 is defined in both the first side flange 214 and the second side flange 218, the adjacent split rotors 21 are aligned and abut through the first side flange 214 and the second side flange 218, and fixation can be realized after the bolts are mounted in the side flange holes 215, so as to form the complete rotor 2.

According to an embodiment of the present application, as shown in FIG. 2 and FIG. 9, multiple reinforcement ribs 216 are provided on an outer surface of the split rotor 21, and each reinforcement rib 216 extends along an axial direction and a radial direction of the split rotor 21; and the third rigid reinforcement tooling structure 13 is detachably connected with the multiple the reinforcing ribs 216.

It should be noted that the outer surface of the split rotor 21 includes the outer circumferential surface of the split rotor 21 and the outer surface of the end of the split rotor 21, and each reinforcing rib 216 includes a portion which extends along the axial direction on the outer circumferential surface of the split rotor 21 and a portion which extends along the radial direction on the outer surface of the end of the split rotor 21, and the two portions are of a continuous integral structure.

In this embodiment, the reinforcement rib 216 can be welded, bolted or integrally formed with outer surface of the split rotor 21. The reinforcement rib 216 is located between the first side flange and the second side flange 218 of the same split rotor 21. The specific number and spacing of the reinforcement ribs 216 can be appropriately adjusted according to the size of the split rotor 21. The specific connection mode of the third rigid reinforcement tooling 13 and the reinforcement ribs 216 can make reference to the content of the transportation tooling structure in the above embodiments, which will not be described in detail here. In the split motor module with the transportation tooling structure provided in this embodiment, the rigidity between the two parting surfaces of the split rotor 21 can be enhanced by mounting the third rigid reinforcement tooling 13 at the reinforcement ribs 216 on outer side surface of the split rotor 21.

According to an embodiment of the present application, as shown in FIG. 13 and FIG. 14, an outer edge of a split rotor end plate 71 is detachably connected with an inner circumferential surface of an open end of the split rotor 21; a fixing side plate 711 for being connected with the adjacent split rotor end plate 71 is arranged at a split surface 710 of each split rotor end plate 71, and an end plate fixing hole 712 is defined on the fixing side plate 711.

In this embodiment, the specific mounting position and matching form of the split rotor end plate 71 and the split rotor 21 can make reference to the content of the transportation tooling structure in the above embodiments, which will not be described in detail here.

In addition, in order to facilitate the connection between the split rotor end plates 71 to form a complete rotor end plate 7, the fixing side plate 711 is provided at the split surface 710 of each split rotor end plate 71, and the split surfaces 710 of adjacent split rotor end plates 71 can be fixedly connected through the respective fixing side plates 711. The end plate fixing hole 712 is defined on each fixing side plate 711, and a connecting member can be mounted in the end plate fixing holes 712 of the adjacent split rotors 71, so as to realize the detachable connection of the adjacent split rotor end plates 71. It should be noted that the split surface 710 of the split rotor end plate 71 refers to an interface after the whole rotor end plate 7 is split according to the size of the split rotor 21, and the complete rotor end plate 7 can be formed after the split surfaces 710 of the adjacent split rotor end plates 71 are connected. In the split motor module with the transportation tooling structure provided in this embodiment, the split rotor end plate 71 is arranged on the inner circumferential surface of the open end of the split rotor 21, and the split rotor is supported by the split rotor end plate 71, so as to improve the rigidity along the circumferential direction of the split rotor 21, prevent the split rotor 21 from deforming or being damaged caused by the adsorption of the split stator 41, and facilitate the split transportation according to the preset assembly requirement.

Figure 12:
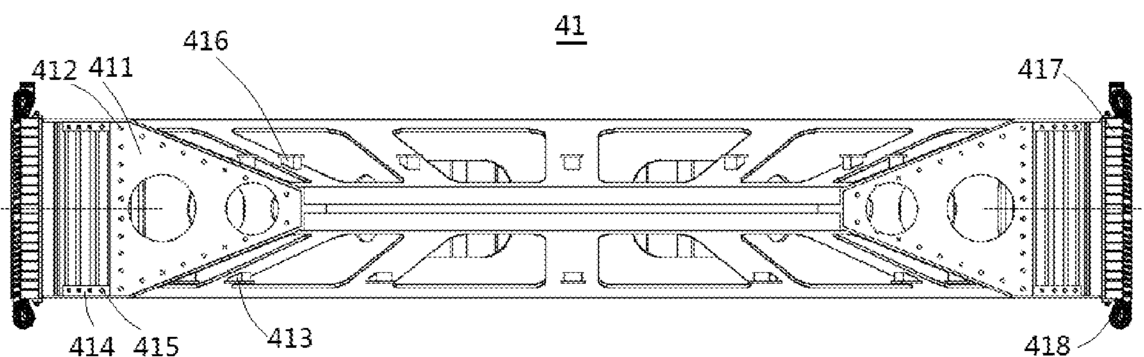
FIG. 12 is a schematic view of a structure inside the split rotor of the modular motor provided according to the embodiment of the present application.

According to an embodiment of the present application, as shown in FIG. 3, FIG. 11 and FIG. 12, stator-side stator support bases 413 with an opening facing the split base plate 81 are provided on a lower portion of the split stator 41, and the stator-side stator support bases 413 are in one-to-one correspondence with base plate side stator support bases 811; stator-side rotor support bases 416 with an opening facing the end of the split rotor 21 are provided on an upper portion of the split stator 41, rotor-side rotor support bases 213 with an opening facing the split stator 41 are provided on the side of the end, close the split stator 41, of the split rotor 21, and the rotor-side rotor support bases 213 are in one-to-one correspondence with the stator-side rotor support bases 416; and two ends of the stator support 5 are respectively inserted in the base plate side stator support base 811 and the corresponding stator-side stator support base 413, and two ends of the rotor support 3 are respectively inserted in the stator-side rotor support base 416 and the corresponding rotor-side rotor support base 213.

Each split stator 41 includes a first side fixing plate 411, a first stator fixing hole 412, a stator-side stator support base 413, a second side fixing plate 414, and a second stator fixing hole 415, a stator-side rotor support base 416, an iron core 417, and a winding 418. The split stators 41 can be connected with each other by a bolt through the first stator fixing hole 412 and the second side fixing plate 414. The stator-side stator support base 413 and the stator-side rotor support base 416 are distributed circumferentially along a central axis of the stator 4 and welded or riveted on the split stator 41. A circumferential position of the stator-side stator support base 413 needs to be consistent with a circumferential position of the base-side stator support 811, and a circumferential position of the stator-side rotor support base 416 is consistent with a circumferential position of the rotor-side rotor support base 213. The iron core 417 can be fixed on the split stator 41 by means of a bolt or welding, and is laminated according to the actual situation of the split stator 41. The winding 418 is embedded in the iron core 417.

In the split motor module with transportation tooling structure provided in this embodiment, bases for positioning and mounting the rotor support 3 and stator support 5 are provided on the upper surface of the split base plate 81, the upper portion and the lower portion of the split stator 41 and the end of the split rotor 21, so as to facilitate the fixed support of the rotor support 3 and stator support 5 through inserting, and improve the mounting efficiency of the transportation tooling structure, and the support stability is high.

Figure 15:
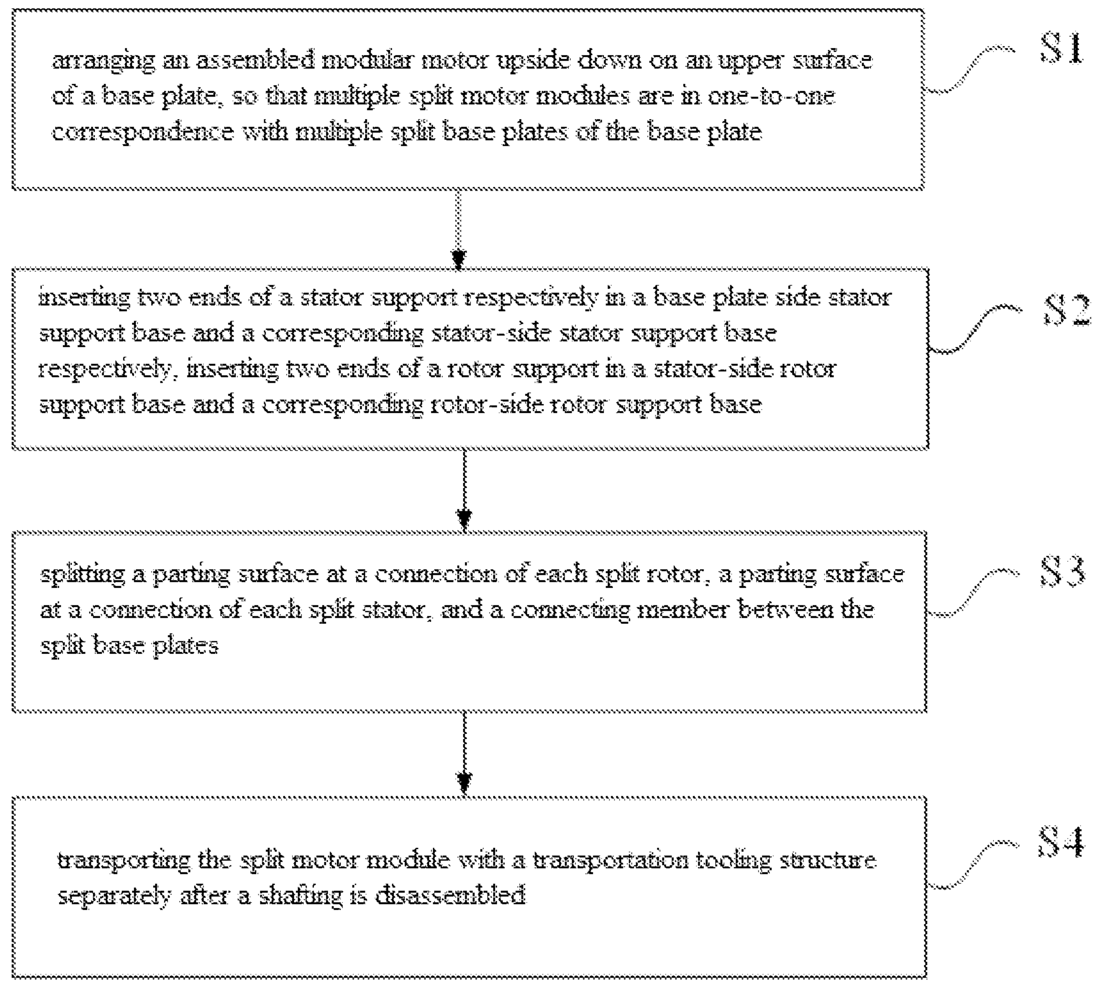
FIG. 15 is a flowchart of a split transportation method for the modular motor provided according to the embodiment of the present application.

Based on the same inventive concept, as shown in FIG. 15, a split transportation method for the modular motor is provided according to the embodiment of the present application, which includes: arranging an assembled modular motor upside down on an upper surface of a base plate 8, so that each split motor module is in one-to-one correspondence with each split base plate 81 of the base plate 8; inserting two ends of a stator support 5 respectively in a base plate side stator support base 811 and a corresponding stator-side stator support base 413 respectively, inserting two ends of a rotor support 3 in a stator-side rotor support base 416 and a corresponding rotor-side rotor support base 213; splitting a parting surface at a connection of each split rotor 21, a parting surface at a connection of each split stator 41, and a connecting member between the split base plates 81; and transporting the split motor module with a transportation tooling structure separately after a shafting is disassembled.

In this embodiment, the assembled modular motor is mounted with the transportation tooling structure, and then the connecting members at the parting surface of each split rotor and each split stator in the modular motor and the connecting members between split base plate are removed, so that the split rotor and the split stator in each split motor module can maintain the original assembly requirement, the whole split motor module can be transported as a whole separately, the split motor module is assembled after the mounting site is arrived, and then the transportation tooling structure module is disassembled, which solves the problem of difficult overall transportation of the large-diameter modular motor, and the transportation tooling structure is simple and is easy to manufacture and mount.

Based on the above embodiments, in order to improve the rigidity of the split rotor 21, the method includes before step S3: mounting a first rigid reinforcement tooling structure 11 on a first side flange 214 at the connection of each split rotor 21, and mounting a second rigid reinforcement tooling structure 12 on a second side flange 218 at the connection of each split rotor 21; and mounting a third rigid reinforcement tooling structure 13 at a reinforcement rib 216 of each split rotor 21 respectively.

In this embodiment, the first rigid reinforcement tooling structure 11 and the second rigid reinforcement tooling structure 12 which are matched with the parting surfaces are respectively mounted at the two parting surfaces of the split rotor 21, so as to enhance the rigidity at the parting surfaces of the split rotor 21; the third rigid reinforcement tooling 13 is mounted on the reinforcement 216 on the outer side surface of the split rotor 21, which can enhance the rigidity between the two parting surfaces of the split rotor 21, and prevent the rotor from deforming due to weak stiffness or being damaged by adsorption of the split stator 41 after the rotor is split into the split rotors 21.

Based on the above embodiments, the method further includes before Si: connecting an outer edge of the rotor end plate 7 to an inner circumferential surface of an open end of each split rotor 21 respectively, so that each split rotor end plate 71 is in one-to-one correspondence with each split rotor 21.

The method further includes between S3 and S4: splitting the connecting member between each split rotor end plate 71 and the inner circumferential surface of the open end of each split rotor 21.

In this embodiment, the split rotor end plate 71 is arranged on the inner circumferential surface of the open end of the split rotor 21, and the split rotor is supported by the split rotor end plate 71, so as to improve the rigidity along the circumferential direction of the split rotor 21, prevent the split rotor 21 from deforming or being damaged by the adsorption of the split stator 41, and facilitate the split transportation according to the preset assembly requirement.

The embodiments of the present application have at least the following beneficial effects:

1. the stator support 5 with a fixed support function between the split stator 41 and the split base plate 81 and the rotor support 4 with a fixed support function between the split stator 41 and the end of the split rotor 21 are provided, so that the whole split motor module can be transported with the split base plate 81 on the premise of maintaining the preset assembly position of the split stator 41 and the split rotor 21, which solves the problem of difficult overall transportation of the large-diameter modular motor, and the transportation tooling structure is simple and is easy to manufacture and mount;

2. the multiple stator supports 5 and the multiple rotor supports 3 are provided, and the multiple stator supports 5 are arranged in the arc array on the upper surface of the split base plate 81, which can further improve the support strength and stability of the split stator 41 and the split rotor 21; in addition, the multiple rotor supports 3 are arranged in one-to-one correspondence with the multiple stator supports 5, which can balance the stress at the stator supports 5 and the rotor supports 3, and prevent the collapse of the whole transportation tooling structure due to uneven stress;

3. it is convenient for the lower end of the stator support 5 and the split base plate 81 to be fixedly supported by inserting by arranging the base plate side stator support base 811 on the upper surface of the split base plate 81, which can improve the mounting efficiency of the transportation tooling structure;

4. the rigidity at the parting surfaces of the split rotor 21 is enhanced by mounting the first rigid reinforcement tooling structure 11 and the second rigid reinforcement tooling structure 12 which are matched the parting surfaces at the two parting surfaces of the split rotor 21 respectively, which can prevent the rotor from deforming due to weak rigidity or being damaged by absorption of the split stator 41 after the rotor is split into the split rotors 21;

5. the rigidity between the two parting surfaces of the split rotor 21 can be enhanced by mounting the third rigid reinforcement tooling 13 on the outer side surface of the split rotor 21;

6. One end, close to the split base plate 81, of the first rigid reinforcement tooling structure 11, the second rigid reinforcement tooling structure 12 and the third rigid reinforcement tooling structure 13 are fixedly connected with the split base plate 81, so as to further enhance the rigidity of the split rotor, can also disperse the support forces of the support stator 5 and the support rotor 7, and improve the support stability of the whole transportation tooling structure on the split motor module;

7. the split rotor end plate 71 is arranged on the inner circumferential surface of the open end of the split rotor 21, and the split rotor is supported by the split rotor end plate 71, so as to improve the rigidity along the circumferential direction of the split rotor 21, prevent the split rotor 21 from deforming or being damaged by the adsorption of the split stator 41, and facilitate the split transportation according to the preset assembly requirement.

Those skilled in the art should understand that the steps, measures, and solutions in the various operations, methods, and processes that have been discussed in this application can be alternated, modified, combined, or deleted. Furthermore, other steps, measures, and solutions in the various operations, methods, and processes that have been discussed in this application can also be alternated, modified, combined, or deleted. Furthermore, the steps, measures, and solutions in the various operations, methods, and processes of this application which have already existed in the conventional technology can also be alternated, modified, combined, or deleted.

In the description of the present application, it should be noted that the orientation or positional relationship indicated by the terms, such as “central”, “upper”, “lower”, “front”, “rear”, “left”, “right”, “vertical”, “horizontal”, “top”, “bottom", "inner", and "outer", are based on the orientation or positional relationship shown in the drawings, which are only to facilitate the description of the present application and to simplify the description, rather than indicating or implying that the device or element referred to must have a specific orientation, or can only be configured and operated in a particular orientation. Therefore the above-mentioned terms should not be construed as a limitation to the present application.

The terms "first", "second" and the like are for purpose of description, and should not be interpreted as indicating or implying relative importance or implying the number of the indicated technical features. Thus, the features defined by "first", "second" and the like can express or impliedly include one or more the features. In the present application, the word "multiple" indicates two or more unless otherwise specified.

In the description of the present application, it should be noted that, otherwise clear specification and definition are provided, terms such as "installation", "joint" and "connection" should be understood in a broad sense, such as a fixed connection, a detachable connection or an integral connection; a direct connection or an indirect connection through an intermediate media, or an internal connection inside two components. For those skilled in the art, the specific meaning of the above terms in the present application may be understood in the light of specific circumstances.

In the description of this specification, specific features, structures, materials or characteristics may be combined in any one or more embodiments or examples in a suitable manner.

It should be understood that although the steps in the flowchart of the accompanying drawings are shown in an order indicated by an arrow, these steps are not necessarily performed in the order as indicated by the arrow. Unless explicitly stated herein, the execution of these steps is not strictly limited to the order and may be performed in other orders. Moreover, at least part of the steps in the flowchart of the accompanying drawings may include multiple sub steps or phases, which are not necessarily executed at the same time, but can be executed at different times, and the execution sequence is not necessarily sequential, but can be executed in turn or alternatively with other steps or at least part of the sub steps or phases of other steps.

Those described above are only some embodiments of the present application. It should be noted that, for those skilled in the art, improvements and modifications may also be made without departing from the principle of the application. These improvements and modifications should also be included in the scope of protection of the present application.

The invention claimed is:

1. A transportation tooling structure of a split motor module, wherein the split motor module comprises a split rotor and a split stator which are arranged according to a preset assembly requirement, the transportation tooling structure comprises: a split base plate, and the split base plate is correspondingly provided with at least one stator support and at least one rotor support;

a lower end of the at least one stator support is fixedly supported on an upper surface of the split base plate, and an upper end of the at least one stator support is fixedly supported on a side, close to the split base plate, of the split stator; and an upper end of the at least one rotor support is fixedly supported on a side of an end of the split rotor that is close to the split stator, and a lower end of the at least one rotor support is fixedly supported on a side of the split stator that is away from the split base plate.

2. The transportation tooling structure of the split motor module according to claim 1, wherein an extending direction of the at least one stator support and an extending direction of the at least one rotor support are perpendicular to the split base plate.

3. The transportation tooling structure of the split motor module according to claim 2, wherein a plurality of stator supports and a plurality of rotor supports are provided; and the plurality of the stator supports are arranged in an arc array on the upper surface of the split base plate, and projections of the plurality of rotor supports on the upper surface of the split base plate are arranged in an arc array.

4. The transportation tooling structure of the split motor module according to claim 3, wherein a center of a circular arc formed by projections of the plurality of stator supports on the split base plate is the same with a center of a base plate corresponding to the split base plate.

5. The transportation tooling structure of the split motor module according to claim 3, wherein a plurality of base plate side stator support bases with an opening facing the split stator are provided on the upper surface of the split base plate, the plurality of base plate side stator support bases are in one-to-one correspondence with the plurality of stator supports, and a lower end of each stator support is inserted in the corresponding base plate side stator support base.

6. The transportation tooling structure of the split motor module according to claim 5, wherein the base plate side stator support bases have a cylindrical structure which extends upward from the upper surface of the split base plate and has an open upper end, and an interior of the cylindrical structure is matched with a lower end of the split stator.

7. The transportation tooling structure of the split motor module according to claim 5, wherein a mounting hole is defined in each base plate side stator support base in a direction perpendicular to the corresponding stator support, and a connecting hole corresponding to the mounting hole in position is defined in the lower end of the corresponding stator support, the mounting hole and the connecting hole are configured to fix the lower end of the corresponding stator support in a case that the corresponding stator support is mounted in the base plate side stator support base.

8. The transportation tooling structure of the split motor module according to claim 1, further comprising a rigid reinforcement tooling for enhancing a rigidity of the split rotor;

wherein the rigid reinforcement tooling comprises: a first rigid reinforcement tooling structure for being detachably connected with a side flange at one parting surface of the split rotor and a second rigid reinforcement tooling structure for being detachably connected with a side flange at another parting surface of the split rotor;

the first rigid reinforcement tooling structure and the second rigid reinforcement tooling structure are formed by butting ends of two first plate-shaped structures with an extending direction in a right angle or a substantially right angle; or, the first rigid reinforcement tooling structure and the second rigid reinforcement tooling structure are both of one first plate-shaped structure with the extending direction in a right angle or a substantially right angle; and a cross section of each first plate-shaped structure is L-shaped.

9. The transportation tooling structure of the split motor module according to claim 8, wherein the rigid reinforcement tooling further comprises: a third rigid reinforcement tooling structure for being detachably connected with a reinforcement rib on an outer side surface of the split rotor;

the third rigid reinforcement tooling structure is formed by butting ends of two second plate-like structures with an extending direction in a right angle or a substantially right angle; or, the third rigid reinforcement tooling structure is of one second plate-shaped structure with the extending direction in the right angle or the substantially right angle; and a cross section of each second plate-shaped structure is T-shaped or L-shaped.

10. The transportation tooling structure of the split motor module according to claim 9, wherein in the first rigid reinforcement tooling structure and the second rigid reinforcement tooling structure, the first plate-shaped structures located on an outer circumferential surface of the split rotor are fixedly connected to an outer edge of the upper surface of the split base plate respectively; and in the third rigid reinforcement tooling structure, the second plate-shaped structure located on the outer circumferential surface of the split rotor is connected to the outer edge of the upper surface of the split base plate.

11. The transportation tooling structure of the split motor module according to claim 1, further comprising a split rotor end plate;

wherein the split rotor end plate is arranged in parallel and above the split base plate, and an outer edge of the split rotor end plate is detachably connected with an inner circumferential surface of an open end of the split rotor; and the split rotor end plate is of a partial annular structure; or, a hollow portion for the at least one stator support to pass through is reserved on the split rotor end plate.

12. A split rotor module with a transportation tooling structure, comprising: a split rotor and a split stator which are arranged according to a preset assembly requirement, and the transportation tooling structure according to claim 1;

the upper end of the at least one stator support is fixedly supported on the side, close to the split base plate, of the split stator; and the upper end of the at least one rotor support is fixedly supported on the side of the end, close to the split stator, of the split rotor; and the lower end of the at least one rotor support is fixedly supported on the side, away from the split base plate; of the split stator.

13. The split motor module with the transportation tooling structure according to claim 12, wherein two parting surfaces of the split rotor are respectively provided with a first side flange and a second side flange; the first rigid reinforcement tooling structure is detachably connected with the first side flange, and the second rigid reinforcement tooling structure is detachably connected with the second side flange.

14. The split motor module with the transportation tooling structure according to claim 13, wherein a plurality of first flange fixing seats extend from an edge of the first side flange in a direction away from the split stator, and a plurality of second flange fixing seats extend from an edge of the second side flange in the direction away from the split stator;

the plurality of first flange fixing seats and the plurality of second flange fixing seats are asymmetric with respect to a centerline of the split rotor;

a plurality of first reinforcement fixing seats are provided in the first rigid reinforcement tooling structure, and the plurality of first reinforcement fixing seats are detachably connected with the plurality of first flange fixing seats; and a plurality of second reinforcement fixing seats are provided in the second rigid reinforcement tooling structure, and the plurality of second reinforcement fixing seats are detachably connected with the plurality of second flange fixing seats.

15. The split motor module with the transportation tooling structure according to claim 14, wherein a plurality of reinforcement ribs are provided on an outer surface of the split rotor, and each reinforcement rib extends along an axial direction and a radial direction of the split rotor; and the third rigid reinforcement tooling structure is detachably connected with the plurality of reinforcing ribs.

16. The split motor module with the transportation tooling structure according to claim 12, wherein an outer edge of a split rotor end plate is detachably connected with an inner circumferential surface of an open end of the split rotor;

a fixing side plate for being connected to an adjacent split rotor end plate is provided at a split surface of the split rotor end plate, and an end plate fixing hole is defined on the fixed side plate.

17. The split motor module with the transportation tooling structure according to claim 12, wherein a plurality of stator-side stator support bases with an opening facing the split base plate are provided on a lower portion of the split stator, and the plurality of stator-side stator support bases are in one-to-one correspondence with the plurality of base plate side stator support bases;

the plurality of stator-side rotor support bases with an opening facing the end of the split rotor are provided on an upper portion of the split stator, a plurality of rotor-side rotor support bases with an opening facing the split stator are provided on the side of the end, close to the split stator, of the split rotor, and the plurality of rotor-side rotor support bases are in one-to-one correspondence with the plurality of stator-side rotor support bases; and two ends of the stator support are respectively inserted in the base plate side stator support base and the corresponding stator-side stator support base, and two ends of the rotor support are respectively inserted in the stator-side rotor support base and the corresponding rotor-side rotor support base.

18. A transportation method for a modular motor, comprising:

arranging an assembled modular motor upside down on an upper surface of a base plate, so that a plurality of split motor modules are in one-to-one correspondence with a plurality of split base plates of the base plate;

inserting two ends of a stator support respectively in a base plate side stator support base and a corresponding stator-side stator support base respectively, inserting two ends of a rotor support in a stator-side rotor support base and a corresponding rotor-side rotor support base;

splitting a parting surface at a connection of each split rotor, a parting surface at a connection of each split stator, and a connecting member between the split base plates; and transporting the split motor module with a transportation tooling structure separately after a shafting is disassembled.

19. The transportation method for the modular motor according to claim 18, comprising: before splitting a parting surface at a connection of each split rotor, a parting surface at a connection of each split stator, and a connecting member between the split base plates, mounting a first rigid reinforcement tooling structure and a second rigid reinforcement tooling structure respectively on a first side flange and a second side flange at the connection of each split rotor; and mounting a third rigid reinforcement tooling structure respectively at a reinforcement rib of each split rotor.

20. The transportation method for the modular motor according to claim 18, further comprising: before arranging an assembled modular motor upside down on an upper surface of a base plate, connecting an outer edge of a rotor end plate to an inner circumferential surface of an open end of each split rotor, so that a plurality of split rotor end plate are in one-to-one correspondence with a plurality of split rotors; and wherein the split transportation method further comprises: before the shafting is disassembled, splitting a connecting member between each split rotor end plates and the inner circumferential surface of the open end of each split rotor.

* * * * *